(12) United States Patent
Fomin et al.

(10) Patent No.: US 9,140,856 B2
(45) Date of Patent: *Sep. 22, 2015

(54) ULTRA-HIGH POWER MULTIMODE COMBINER

(71) Applicant: IPG Photonics Corporation, Oxford, MA (US)

(72) Inventors: Valentin Fomin, Siegen (DE); Andrey Abramov, Burbach (DE); Dmitry Mochalov, Siegen (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,179

(22) Filed: Feb. 26, 2014

(65) Prior Publication Data

US 2014/0241663 A1     Aug. 28, 2014

Related U.S. Application Data

(60) Provisional application No. 61/770,607, filed on Feb. 28, 2013.

(51) Int. Cl.
*G02B 6/26* (2006.01)
*G02B 6/42* (2006.01)
*G02B 6/28* (2006.01)

(52) U.S. Cl.
CPC ............ *G02B 6/2856* (2013.01); *G02B 6/4296* (2013.01)

(58) Field of Classification Search
CPC ..... G02B 27/0905; G02B 6/14; G02B 6/2856
USPC .............................................. 385/29; 359/349
See application file for complete search history.

(56) References Cited

U.S. PATENT DOCUMENTS

2010/0278486 A1* 11/2010 Holland et al. ................. 385/43
2012/0300797 A1* 11/2012 Durkin et al. .................... 372/6

* cited by examiner

*Primary Examiner* — Ryan Lepisto
(74) *Attorney, Agent, or Firm* — Yuri Kateshov, Esq.; Timothy J. Kivg, Esq.

(57) ABSTRACT

An ultra-high power fiber laser system includes a multimode combiner which is configured with a plurality of low mode fibers bundled together and tapering toward its downstream end. A clad mode absorber extends along the tapered downstream end and over a portion of the combiner's output fiber. The absorber is configured with adjacent zones which are provided with respective refractive indices. In a forward propagating direction of signal, the upstream zone includes polymeric material with the refractive index higher than that of the cladding of the combiner end fiber. The intermediate zone includes polymeric material configured with a refractive index lower than that of the cladding of the combiner output fiber. The downstream zone is configured with polymeric material having a refractive index lower than that of the cladding of the combiner output fiber and impregnated with a plurality of light diffusers.

10 Claims, 1 Drawing Sheet

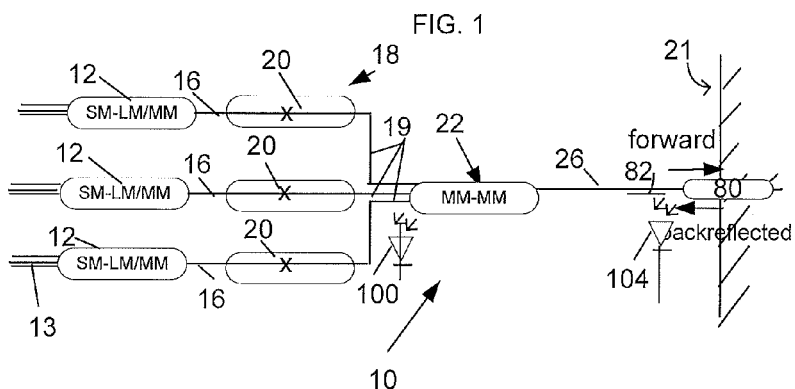
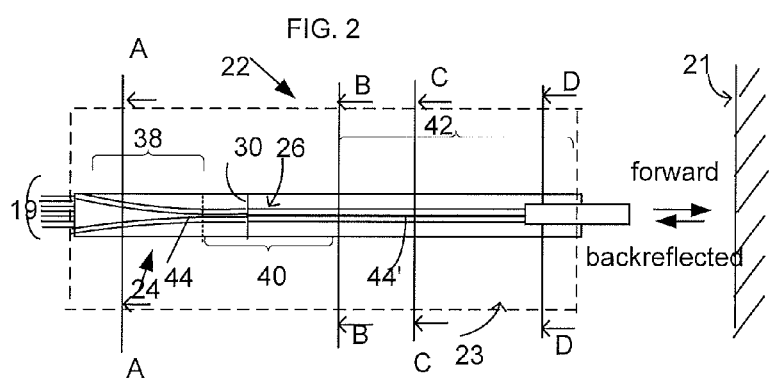
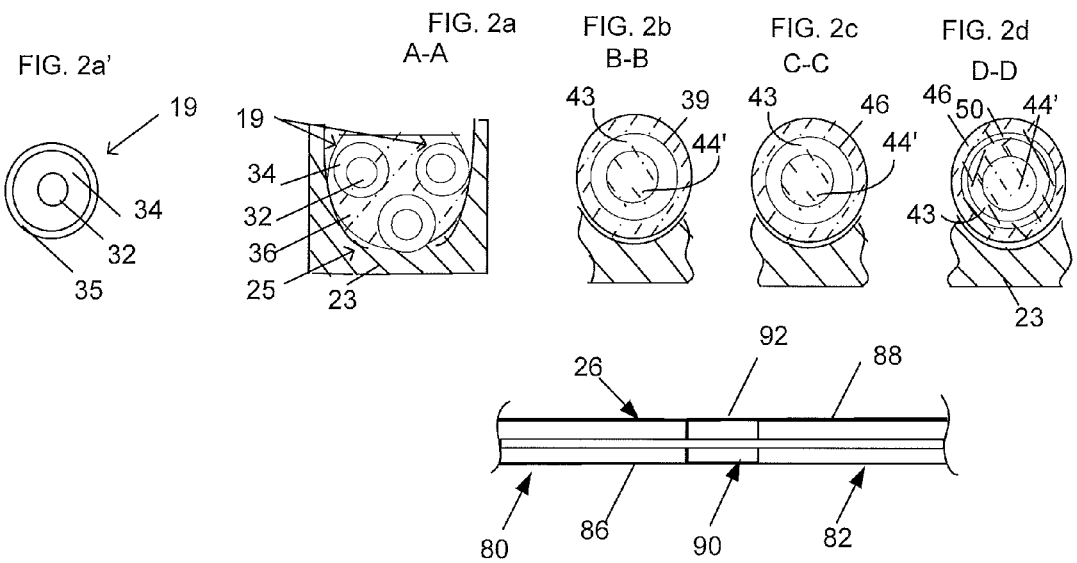
FIG. 1
FIG. 2
FIG. 2a'
FIG. 2a A-A
FIG. 2b B-B
FIG. 2c C-C
FIG. 2d D-D
FIG. 3

ULTRA-HIGH POWER MULTIMODE COMBINER

CROSS-REFERENCE TO RELATED APPLICATION

This application is related to a U.S. Provisional Application concurrently Ser. No. 61/770,607 filed concurrently therewith and fully incorporated herein by reference in its entirety.

BACKGROUND OF THE DISCLOSURE

1. Field of the Disclosure

The disclosure relates to ultra-high power fiber laser systems. Particularly, the disclosure relates to an ultra-high power multimode ("MM") fiber system emitting tens of kWs, MM laser output and configured with a mechanism which is operative to efficiently filter out unwanted forward-propagating and backreflected cladding light.

2. Prior Art

Multi kW fiber laser systems are used in a growing number of applications. As fiber lasers mature towards commercial deployment, an intense focus on their power, quality, reliability and that of their components is required. To enable the desired power levels, multiple low-mode ("LM") fiber laser systems are optically and mechanically coupled together in a LM-MM combiner. To efficiently perform at high kW power levels, the combiner should successfully deal with a few structural difficulties some of which, such as mechanical coupling of fibers and power loses in forward and backreflection directions, are of particular interest here.

In general, a process of fabricating high power combiner includes fusing aligned output fibers of respective fiber lasers/amplifiers in a bundle, tapering the latter, cleaving and splicing the tapered bundle to a system output delivery fiber. The fabrication of the combiner which initially assumes a bow-tie configuration, whose waist is farther severed in half, may result in structural defects (burrs) of the outer cladding which further, during the combiner's deployment, may detrimentally affect the quality of the output laser beam and power thereof.

With outputs of fiber laser systems reaching tens of kWs, both forward and backreflected propagating core-guided light tends to bleed into the adjacent cladding at air-quartz interfaces and splices between various fibers as it propagates through the system. Once in the cladding, high power signal light induces thermal loads on a polymeric coating surrounding the cladding. The coating is configured to minimize the structural damages that a fiber may experience as a result of external mechanical loads applied to the fiber. Both forward-propagating signal light and, particularly, backreflected light—light reflected from the surface to be laser treated—may bled into a cladding which is damaging both to a combiner itself and to system components upstream therefrom which are particularly vulnerable when they are exposed to the backreflected light. Accordingly, both forward and backward propagating cladding light have be removed from a waveguide.

In summary, to attain an optical power of up to several tens of kWs at the output of the LM waveguide, the combiner needs a special configuration which would allow the following:

(1) Reliably fix input fibers together without degrading the quality of the output beam and loosing light power;
(2) Efficiently distribute and utilize power losses of forward and backward propagating light; and
(3) Provide protection of the fibers from environmental impurities as a result of heat-induced deformation.

A need therefore exists for an ultra-high power MM fiber laser system meeting the above-articulated conditions.

SUMMARY OF THE DISCLOSURE

In accordance with one aspect of the disclosure, the fibers guiding outputs of respective individual low mode fiber laser systems each have a multi-layer configuration so as to improve reliable coupling among output fibers and minimize the possibility of damaging their respective cores while fabricating a LM-MM combiner. The multi-layer configuration of each double-clad fiber, referred further as input fibers, includes inner and outer layers. The inner layer includes silicone dioxide ($SiO_2$), whereas the outer layer is made from $SiO_2$ doped with ions of fluorine ("F") and having a relatively low melting temperature. The presence of the outer layer substantially minimizes damage to individual fiber components during the fabricating process of the combiner.

In accordance with another aspect of the disclosure, the LM/MM combiner is configured with an absorber capable of efficiently removing unwanted forward-propagating and backreflected light guided along cladding regions of the disclosed system. The absorber is configured with upstream, intermediary and downstream consecutive zones responsible for removing unwanted light which has two sources of origin. One source includes losses of forward propagating signal light as it is guided through splice regions between fibers. The other source relates to backreflected light which is coupled into the core and cladding of the feeding fiber upon bouncing back from the workpiece in a counter-propagating direction.

Viewed along a forward propagation direction of signal light, the upstream zone is configured to predominantly prevent back reflected light from reaching individual LM fiber laser systems. The zone is defined by a polymer having a refraction index higher than that of quartz.

The intermediary zone is configured to prevent high aperture rays of signal light lost at upstream splices and guided along a cladding in a forward propagating direction from escaping the combiner. The polymer constituting this zone is configured with a refraction index substantially the same as or lower than quartz. And finally, the downstream zone is configured similar to the upstream zone, but operative to remove forward propagating signal light which was not processed in the intermediary zone.

A further aspect deals with a MM high power fiber laser system including the disclosed combiner. The system is configured with a cladding mode absorber which is operative to minimize and provide removal of backreflected light which is coupled into the cladding of the system's output fiber.

BRIEF DESCRIPTION OF THE DRAWINGS

The above and other features and advantages of the disclosed structure become more readily apparent from the following specific description accompanied by the drawings, in which:

FIG. 1 is an elevated view of the disclosed high power fiber laser system;

FIG. 2a' is an end view of individual fiber prior to the removal of the protective coating;

FIG. 2 is a diagrammatic view of a LM/MM-MM combiner component of the system of FIG. 1;

FIGS. 2a-2d are respective cross-sectional views along respective lines in FIG. 2;

FIG. 3 is a diagrammatic view of a cladding mode absorber of system of FIG. 1.

SPECIFIC DESCRIPTION

Reference will now be made in detail to the preferred embodiments of the disclosure. Wherever possible, same or similar reference numerals are used in the drawings and the description to refer to the same or like parts or steps. The drawings are in very simplified form and are not to precise scale.

FIG. 1 illustrates a diagrammatic view of high power fiber laser system 10 capable of emitting a high quality beam of up to about 50 kWs. The system 10 is configured with a plurality of low mode ("SM-LM/MM") fiber combiners 12 each of which is operative to emit radiation in low mode or multiple transverse mode system output. The configuration of SM-LM/MM combiner is disclosed in concurrently filed U.S. Provisional Application 61/770,607. The SM-LM/MM laser combiners 12 are provided with respective LM/MM output passive fibers 16 each of which is spliced directly or via an intermediary passive fiber with an input MM passive fiber 19. The fusion region forms thereby an upstream splice surrounded by a splice filter 20. The LM input fibers 19 are then aligned and further mechanically and optically coupled to one another in a LM/MM-MM combiner 22. The system 10 is completed with a downstream system clad mode absorber 80.

Referring to FIGS. 2 and 2a, LM-MM combiner 22 is formed by initially aligning multiple LM/MM passive input fibers 19, each of which is configured with a large diameter MM core 32 (FIG. 2a) and outer cladding 34, with one another to define a large diameter input end of the bundle as shown in FIG. 2a. Thereafter, aligned LM/MM input fibers 19 are simultaneously fused and stretched into a small diameter downstream end 24 of the tapered bundle. The downstream end 24 of the bundle includes a single core formed upon fusing and stretching individual input fiber 19. The stretching is performed so that the diameters of downstream end 24 of the fused bundle and MM combiner output passive fiber 26, respectively, substantially, but not ideally, match one another. As a result, fusing these elements forms a splice region 30 configured so that light experiences low splice losses as it propagates through this splice region 30.

Depending on the number of LM/MM input fibers 19, a combined beam output may reach of up to about 50 kW and have a BPP, for example, below 20 and as low as 10. The downstream end 24 of the tapered bundle and an upstream portion of combiners output fiber 26 are placed in a housing 23 which, in turn, is coupled to a heat sink not shown here.

The input fibers 19 entering housing 23 are fixed to one another by any suitable adhesive. Due to high powers and therefore elevated temperatures, the adhesive includes a temperature resistant component which may be, for example, UV-15-TK.

The scaling of combiner 22 critically depends on how effectively unwanted cladding-guided light. Which propagates along the combiner in opposite directions, is utilized. Typically, mechanisms dealing with light removal from the waveguide's cladding are called light strippers or clad mode absorbers ("CMA").

The CMA is provided over a length including a portion of the tapered bundle and a portion of combiner's output fiber 26. The CMA is configured with three consecutive—upstream, intermediary and downstream—zones 38, 40 and 42, respectively, and is operative to minimize the amount of cladding light. The cladding light propagates in opposite propagating and counter-propagating directions and, as known to one of ordinary skill in the fiber laser art, negatively affects the fiber and other optical components of laser system 10. Even a hundred-watt back reflected cladding light, which in the disclosed system may easily reach kWs can be damaging to combiner 22, but even more so to individual SM systems that may receive this light through respective fibers 19 and other waveguides upstream from combiner 22.

The upstream zone 38, extending along a portion 24 of the tapered bundle and terminating at a short distance from splice 30, is configured to at least minimize propagating of back reflected light before this light will reach individual LM laser systems 18 (FIG. 1) and other components upstream therefrom.

The back reflected light has several regions of origin. For example, workpiece 21 partially reflects signal light which is coupled both into the cladding and core of a feeding fiber 82 (FIG. 1) fused to combiner output fiber 26. The zone 38 is structured to deal with backreflected light that initially is coupled into core of feeding fiber 82 and further into core 44' of output fiber 26 (FIG. 2d) which guides the light to splice region 30. Since the overlap between cross-sectional areas of respective downstream end 24 and output fiber 26, which define region 30, is not ideal, back reflected light fills up a greater area of the downstream end of the bundle than core 44 (FIG. 2). Hence the light not confined to the core of the downstream end of the tapered bundle bleeds out. To remove this light, the coating polymer 35 (FIG. 2a') of each fiber 19 is replaced with a protective polymeric layer 36 which has a refractive index higher than that of both core 32 and cladding 34.

Referring specifically to FIG. 2a, polymer 36 initially fills up housing 23 and interstices between fibers 19 which still have respective protective coatings 35 of FIG. 2a' although not shown here in (FIG. 2a) for the purposes of clarity. Within zone 38, polymer 36 initially removes backreflected light directly from core 44 of downstream end 24, cladding 34 and further from protective coatings 35 of respective individual fibers 19 where they remain intact. The polymer 36 terminates at a short distance from splice 30 between bundle's downstream end 24 and the upstream end of output fiber 26.

Referring to FIGS. 2 and 2b, intermediate zone 40 (FIG. 2) of the disclosed CMA extends from the end of upstream zone 38 over the downstream end 24 of the tapered bundle and then through splice 30 and terminates at a distance upstream from the downstream end region of output fiber 26. The latter is stripped from its protective coating along intermediary zone 40. Instead, it is a polymeric layer 39 (FIG. 2b) that covers inner cladding 43 of output fiber 26 which has a refractive index at least equal to or higher than that of layer 39. Accordingly, layer 39 is configured to minimize losses of forward propagating signal light by preventing its decoupling from cladding 43.

Referring to FIGS. 2, 2c and 2d, downstream zone 42 of the absorber is configured with polymeric layer 46 which is configured to minimize the amount of forward propagating signal light guided along cladding 43 of output fiber 26. The downstream zone 42 extends over the larger portion of output fiber 26, which is stripped from the protective coating, and partly overlays the downstream end of this fiber still having protective coating 50 (FIG. 2d). The latter is left intact along the end region of output fiber 26 to improve its coupling to housing 23 (FIG. 2).

Similar to layer 39 of the intermediary zone 40, polymeric layer 46 is configured with a host material, such as silicone gel, which has a refractive coefficient substantially equal to that of quartz. The host material is doped with a plurality of diffusers including, for example, particles of $Al_2O_3$. The diffusers do not absorb light incident thereupon; they omnidirectionally scatter it with a portion of scattered light being directed outside fiber 26. Thus, the high NA forward propagating clad-guided light, when incident on the diffusers, can be partially guided into a potting material covering the absorber in housing 23 and further through the housing to a heat sink not shown here. The concentration and distribution of diffusers are selected to provide a substantially uniform removal of high NA signal.

The absorbed light, whether it is forward- or back reflected-propagating light should be efficiently transferred to a heat sink; otherwise the structural integrity of combiner 22 can be irreversibly compromised. The housing 23, enclosing combiner 22 and part of output fiber 26 which are protected by the absorber, is provided with a semi-spherical groove 25 (FIGS. 2 and 2a) receiving combiner 22 and thus contributing to the mechanical and thermal stability of the entire laser system. The material of housing 23 is selected with high heat resistance and low coefficient of thermal expansion so as to minimize the degree of deformation of housing 23 at elevated temperatures during the operation of the disclosed fiber laser system. Otherwise, the housing's elongation may damage fibers and/or negatively affect the optical parameters. Preferably, the material includes copper layered with a strip of gold or a tungsten copper (CuW) pseudo alloy. Upon placing the CMA in housing 23, U-shaped groove 25 and other free space within housing 23 is filled with polymer 36 which contributes to the mechanical and thermal integrity of the disclosed structure.

Turning briefly to FIG. 1, system 10 may have a reliable monitoring system including several photodiode detectors. For example, a sensor 100 is positioned in close vicinity of the upstream of combiner 22 to detect back reflected light propagating along the core 44 (FIG. 2a). The photodiode 104 is located to detect remaining back reflected light not removed by system absorber 80. The power losses of signal light can be monitored at any convenient location along the waveguide, for example, a sensor may be positioned to measure power of signal light at the output of combiner 22.

FIG. 3 illustrates a clad-guided light stripper ("CLS") 80 provided over the downstream end region of system output fiber 26 and feeding fiber assembly which is configured with upstream MM passive fiber 90 and downstream delivery fiber 82. All of the fibers 26, 90 and 82 are uniformly configured with respective cores and claddings being substantially uniformly dimensioned. The CLS 80 includes polymer directly coated over the claddings of respective fibers 26, 90 and 82 and thus configured with three zones.

The upstream zone 86 of CLS 80 covers the area stripped from a protective coating of the downstream end of output fiber 26. The refractive index of polymer along zone 86 is higher than that of the inner cladding which allows removing a light portion of signal light guided along the cladding in the propagating direction.

The intermediary zone 92 of CLS 80 is configured with a relatively low index of refraction which confines the cladding-guided signal light to fiber 90. Finally, downstream zone 88 includes a polymeric layer 94 with a refractive index higher than that of the adjacent cladding. As a result, the back reflected light coupled into the cladding of system output fiber 82 is guided outside the latter into a surrounding heat sink.

A variety of changes of the disclosed structure may be made without departing from the spirit and essential characteristics thereof. Thus, it is intended that all matter contained in the above description should be interpreted as illustrative only and in a limiting sense, the scope of the disclosure being defined by the appended claims.

The invention claimed is:

1. A multimode ("MM") high power combiner, comprising:
   a plurality of passive low mode ("LM") fibers guiding respective outputs, the LM fibers being bundled together to define a tapered downstream end of a bundle, the downstream end having a core guiding combined MM signal light in a propagating direction, and at least one cladding;
   a MM combiner output fiber butted to the tapered downstream end so as to define a splice therebetween, the output fiber having a cladding surrounding a core which guides the MM signal light, the MM signal light being incident on a workpiece which partially reflects the incident MM signal light so that the reflected MM signal light is coupled into the core and cladding of the output fiber in a counter-propagating direction; and
   a clad mode absorber ("CMA") surrounding the downstream end of the bundle and extending over a part of the combiner output fiber, the CMA being configured with:
      a downstream zone extending over the output fiber and terminating at a distance from a downstream end thereof, the downstream zone being configured to scatter the MM signal light bled into the cladding upstream from the output fiber,
      an intermediary zone extending over the splice and regions of respective tapered downstream end and output fiber bordering the splice and configured to prevent decoupling of the signal MM light, and
      an upstream zone extending along the downstream end of the bundle, the upstream zone being configured to strip the reflected light coupled into the core of the combiner output fiber and bled through the splice into the cladding of the end fiber.

2. The MM combiner of claim 1, wherein the CMA includes a polymer configured with:
   a first index of refraction higher than that of the one cladding of the end of the bundle along the upstream zone,
   a second index at most equal to that of the claddings of respective fiber regions bordering the splice and defining the intermediary zone, and
   a third index at most equal to that of the cladding of the output fiber along the downstream zone, the polymer of the downstream zone being doped with a plurality of diffusers configured to scatter the portion of the MM light.

3. The MM combiner of claim 2, wherein the diffusers include particles of aluminum oxide $Al_2O_3$.

4. The MM combiner of claim 1, wherein the MM light is incident on the workpiece with a beam product parameter ranging between about 10 and about 20 and in an output power range between about 40 kW and about 60 kW.

5. The MM combiner of claim 1, wherein the MM core of the MM combiner output fiber is made from silicon dioxide ($SiO_2$), and
   the cladding is made from $SiO_2$ and doped with fluoride (F) ions.

6. The MM combiner of claim 1 further comprising a housing enclosing the absorber, the output fiber being stripped from a protective coating along the intermediary zone and a larger portion of the downstream zone.

7. The MM combiner of claim 1 further comprising an upstream light detector operative to detect back reflected core guided light.

8. An ultra-high power fiber laser system, comprising:
the MM combiner of claim 1; and
a MM feeding fiber assembly including:
- an upstream multimode ("MM") passive fiber coupled to a downstream end of the combiner output fiber, and
- a downstream system output MM passive fiber butted to the upstream MM passive fiber, wherein the combiner output, upstream and system output fibers are uniformly configured.

9. The ultra-high power fiber laser system of claim 8 further comprising a cladding light stripper ("CLS") surrounding adjacent regions of respective combiner output and feeding fiber assembly and configured with upstream, intermediary and downstream zones,
- wherein the upstream zone includes a polymer having an index of refraction higher than that of the cladding of combiner output fiber and operative to remove the signal light guided in the cladding in the propagating direction,
- the intermediary zone including a polymer configured with a refractive index lower than that of the underlying cladding; and
- the downstream zone provided with a polymer having a refractive index higher than that of the cladding of the system output fiber so as to remove the reflected light coupled into the cladding of the output fiber.

10. The ultra-high power fiber laser system of claim 9, wherein the adjacent regions of respective combiner output, upstream and system output fibers are stripped from respective protective layers.

\* \* \* \* \*